United States Patent
Lee et al.

(10) Patent No.: US 9,916,529 B1
(45) Date of Patent: Mar. 13, 2018

(54) MULTIFUNCTIONAL TOUCH SMART CARD

(71) Applicant: GOTrust Technology Inc., Taichung (TW)

(72) Inventors: Darren Tien-Chi Lee, Taichung (TW); Jeng Lung Li, Taichung (TW)

(73) Assignee: GOTRUST TECHNOLOGY INC., Taichung (TW)

( * ) Notice: Subject to any disclaimer, the term of this patent is extended or adjusted under 35 U.S.C. 154(b) by 0 days.

(21) Appl. No.: 15/462,223

(22) Filed: Mar. 17, 2017

(30) Foreign Application Priority Data

Nov. 3, 2016 (TW) .............................. 105135783 A (51) Int. Cl.
| | |
|---|---|
| *G06K 19/077* | (2006.01) |
| *G06K 19/14* | (2006.01) |
| *G06F 3/041* | (2006.01) |
| *G06K 19/07* | (2006.01) |
| *G06K 7/10* | (2006.01) |
| *G06Q 20/34* | (2012.01) |
| *G06Q 20/36* | (2012.01) |

(52) U.S. Cl.
CPC ........... *G06K 19/14* (2013.01); *G06F 3/0416* (2013.01); *G06K 7/10297* (2013.01); *G06K 19/0723* (2013.01); *G06K 19/07701* (2013.01); *G06Q 20/341* (2013.01); *G06Q 20/36* (2013.01)

(58) Field of Classification Search
CPC .................................................. G06Q 20/3275
USPC .................................................. 235/449, 492
See application file for complete search history.

(56) References Cited

U.S. PATENT DOCUMENTS

| | | | |
|---|---|---|---|
| 2010/0167754 A1* | 7/2010 | Jolivet ................... | H04W 8/205 455/456.1 |
| 2012/0105356 A1* | 5/2012 | Brosnan ................... | G06F 3/044 345/174 |
| 2012/0188176 A1* | 7/2012 | Uzelac ..................... | G06F 3/044 345/173 |
| 2015/0069126 A1* | 3/2015 | Leon ................ | G06K 19/06206 235/449 |
| 2015/0371215 A1* | 12/2015 | Zhou ...................... | G06Q 30/02 705/71 |
| 2017/0079591 A1* | 3/2017 | Gruhlke ................ | A61B 5/6898 |
| 2017/0154328 A1* | 6/2017 | Zarakas ............... | G06Q 20/341 |

FOREIGN PATENT DOCUMENTS

| | | |
|---|---|---|
| TW | M396452 U | 1/2011 |
| TW | 201344585 A | 11/2013 |

* cited by examiner

*Primary Examiner* — Allyson Trail
(74) *Attorney, Agent, or Firm* — Muncy, Geissler, Olds & Lowe, P.C.

(57) ABSTRACT

The present invention provides a multifunctional touch smart card, having: an operation center, a touch part, a security element, and a battery. The touch part is capable of controlling operation of the operation center and the security element. The battery supplies power to the operation center, the security element, and the touch part. A touch button design is adopted for the smart card of the present invention, so a button of the present invention can be disposed at any position of the smart card. Thus, not only may the card have a more beautiful appearance design, but also it is easier to lay out circuits of the smart card.

16 Claims, 11 Drawing Sheets

MULTIFUNCTIONAL TOUCH SMART CARD

BACKGROUND OF THE INVENTION

1. Field of the Invention

The present invention relates to a smart card, and in particular, to a multifunctional touch smart card.

2. Description of the Related Art

Nowadays, as science and technologies develop rapidly, various functions such as an electronic wallet, an entrance guard card or a membership card can be integrated into a smart card, so smart cards are gradually integrated into people's lives. In view of the multifunctionality of smart cards, many banks make credit cards/financial cards into smart cards each having an electronic wallet, an entrance guard card or a membership card integrated. A user may use only one card to perform a card payment transaction, make a mobile payment or pass an entrance guard, thereby providing the user with greater convenience.

Figure 13:
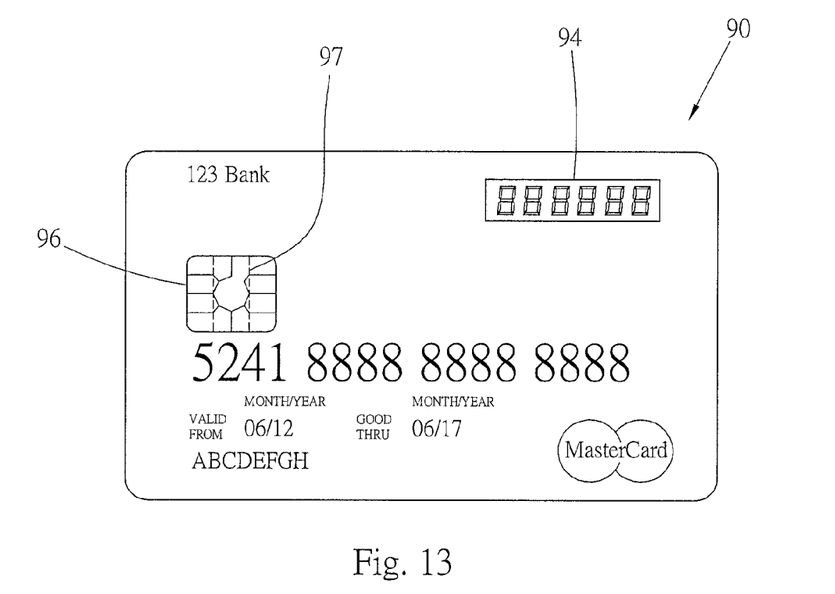
FIG. 13 shows the front side of a conventional smart card.
Figure 14:
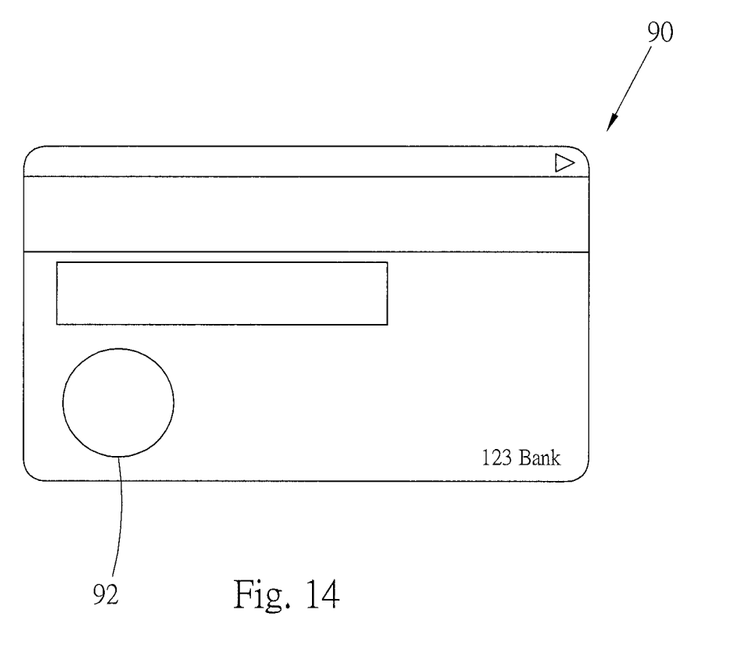
FIG. 14 shows the rear side of the smart card in FIG. 13.

With the maturation and development of smart cards, many companies and manufacturers improve structures and functions of smart cards, making smart cards suitable for wider application. For example, referring to FIG. 13 and FIG. 14, a smart card 90 is disposed with a button 92 and a small screen 94. A user only needs to press the button 92, and the screen 94 then displays, for example, the balance in an electronic wallet or membership points owned by the user currently, thereby making use of the smart card 90 more convenient. Alternatively, when the user makes an online card payment, the user presses the button 92, and the screen 94 can then display a one-time password (OTP). The user needs to enter the one-time password onto an online verification page of a bank to complete a card payment. In this way, a risk that a lawless person steals information of a credit card and uses the credit card to make a payment can be avoided, thereby making the smart card more practicable. For another example, a Bluetooth low energy (BLE) element is disposed inside a smart card. When the user presses a button, the Bluetooth element of the smart card can be paired with or connected to a Bluetooth module of a mobile phone. In this way, when making an online card payment, the user only needs to place the smart card near the mobile phone and presses a button on the smart card, and the Bluetooth element of the smart card can then be connected to the Bluetooth module of the mobile phone, to pass the validation of the bank, thereby improving the security of online transactions.

As functions of smart cards become increasingly complex, the smart cards also have increasingly complex structures. For example, the foregoing button, screen, and Bluetooth element are all disposed in the inner space of the smart card. In respond to a function added to a smart card, the inner space of the smart card also needs to be disposed with an element or module (for example, a Bluetooth antenna) corresponding to the new function. Moreover, the screen and the Bluetooth element both need electric power to perform operation. Therefore, a battery also needs to be disposed in the inner space of the smart card to supply electric power to the screen and the Bluetooth element to perform operation. As can be seen, the inner space of the smart card is very crowded.

However, with the development of the society and the development of science and technologies, an increasing quantity of functions and different kinds of cards need to be integrated into the same smart card. However, the inner space of the smart card is limited, and each element occupies some inner space. For example, referring to FIG. 14 again, currently, the button 92 used in the commercially available smart card 90 is a mechanical button (for example, a membrane button). The mechanical button has a relatively large volume and has a certain thickness. Due to technical limitations in the current production process, the mechanical button cannot be disposed overlapping another element or circuit. The mechanical button needs to be independently disposed in the inner space of the smart card. Therefore, space for another element to be disposed is compressed, so that the smart card has no space to add a new element, which impedes the development of smart cards. Next, contact metal pieces on outer sides of existing smart cards are all fabricated and perform information transmission according to the ISO7816 standard. In the ISO7816 standard, no function is set in a partial area (for example, an area 97 of a contact metal piece 96 of the smart card 90 in FIG. 13) of a contact metal piece. Therefore, although the contact metal piece takes up certain space of the smart card, the contact metal piece is not fully used. For a manufacturing company or a manufacturer of a smart card, this is not a desirable structural design. Moreover, as a smart card has increasingly complex functions, an amount of electric power required by the smart card also keeps increasing, so that the smart card has decreased electric endurance, thereby easily resulting in a situation in which the smart card can no longer be used because electric power of a battery of a smart card is used up.

In conclusion, how to simplify the internal structure of a smart card and effectively use the inner space of the smart card to add a function or enhance the capability of the smart card is commercially required and is a problem that still needs to be resolved.

SUMMARY OF THE INVENTION

A major objective of the present invention is to provide a multifunctional touch smart card, in which the inner space can be flexibly used, so it is convenient to layout circuits, and improve existing functions of the smart card or add functions to the smart card.

Another objective of the present invention is to provide a multifunctional touch smart card, which can be operated in a touch manner.

Still another objective of the present invention is to provide a multifunctional touch smart card, in which a contact metal piece can be used to perform touch operation.

The present invention provides a multifunctional touch smart card, comprising:

an operation center being an operation core of the smart card;

a touch part for controlling operation of the operation center;

a security element for performing operation under the control of the operation center;

a battery for supplying power to the operation center, the security element, and the touch part; and a power supply management module for manipulating operation of the battery under the control of the touch part, and the battery also supplies power to the power supply management module.

Preferably, the multifunctional touch smart card further comprising: a contact metal piece, wherein the touch part is located at the contact metal piece.

Preferably, the touch part is a metal piece, disposed inside the smart card.

Preferably, the multifunctional touch smart card further comprising: a Bluetooth antenna, wherein the operation center is a Bluetooth module, the Bluetooth module is controlled by the touch part, the security element is further capable of sending security information, and the Bluetooth module is capable of receiving the security information of the security element and transmitting the security information outwards through the Bluetooth antenna.

Preferably, the multifunctional touch smart card further comprising: a display unit, wherein the operation center is a control unit, the control unit is controlled by the touch part, the security element is further capable of sending security information, the control unit is capable of receiving the security information of the security element and converting the security information into a verification message, the display unit is capable of displaying the verification message sent by the control unit, and the battery also supplies power to the display unit.

Preferably, the multifunctional touch smart card further comprising: a touch processing unit, wherein the touch processing unit has a touch corresponding mechanism and is capable of sending an operation command, the operation command being capable of comprising a different instruction, the touch part is capable of generating a touch record, the touch record being capable of comprising a different touch information, the touch processing unit generates, according to the different touch information of the touch record by using the touch corresponding mechanism, an operation command comprising a corresponding instruction, the touch part controls the operation center and the power supply management module by using the operation command of the touch processing unit, and the battery supplies power to the touch processing unit.

Preferably, the multifunctional touch smart card further comprising: a wireless communication antenna, capable of performing information transmission with the security element.

Therefore, in the smart card of the present invention, a touch button is used to replace a conventional mechanical button. The touch button has a small volume and a small thickness and can be disposed overlapping another element or circuit, so that the touch button can be disposed at any position of the smart card. In this way, the appearance of the smart card may be easier to design and more beautiful, and inner space, originally occupied by the mechanical button, of the smart card can be further released. The released space is used to improve the flexibility of the circuit layout, add a function to the smart card, or increase the capacity of a battery, or increase a volume of a Bluetooth antenna or/and a wireless communication antenna, thereby improving the functionality of the smart card, the endurance of the battery or communication intensity of antennas. Next, in the present invention, the touch button is also integrated with a contact metal piece of the smart card, and the button is disposed in an unused area of a conventional contact metal piece, so that the contact metal piece can be used to not only perform a conventional card payment transaction, but also control a Bluetooth module, a control unit or even overall operation of the smart card in a touch manner, thereby improving the functionality of the contact metal piece.

BRIEF DESCRIPTION OF THE DRAWINGS

To enable examiners to further understand the objectives, features, and achieved efficacy of the present invention, four preferred embodiments of the present invention are described in detail below with reference to the accompanying drawings.

DETAILED DESCRIPTION OF THE PREFERRED EMBODIMENTS

Figure 1:
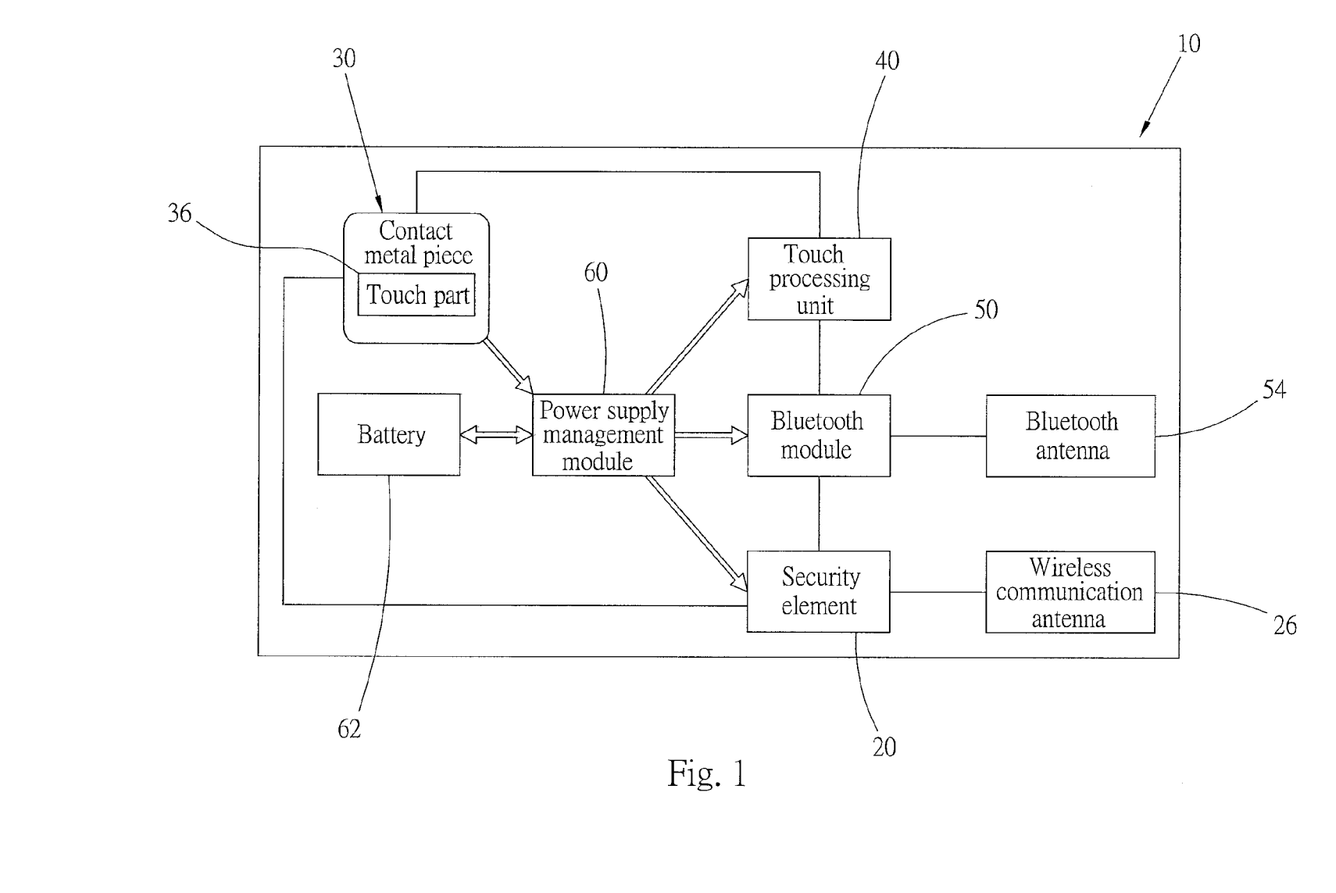
FIG. 1 is an architectural diagram of a smart card according to a first preferred embodiment of the present invention.
Figure 2:
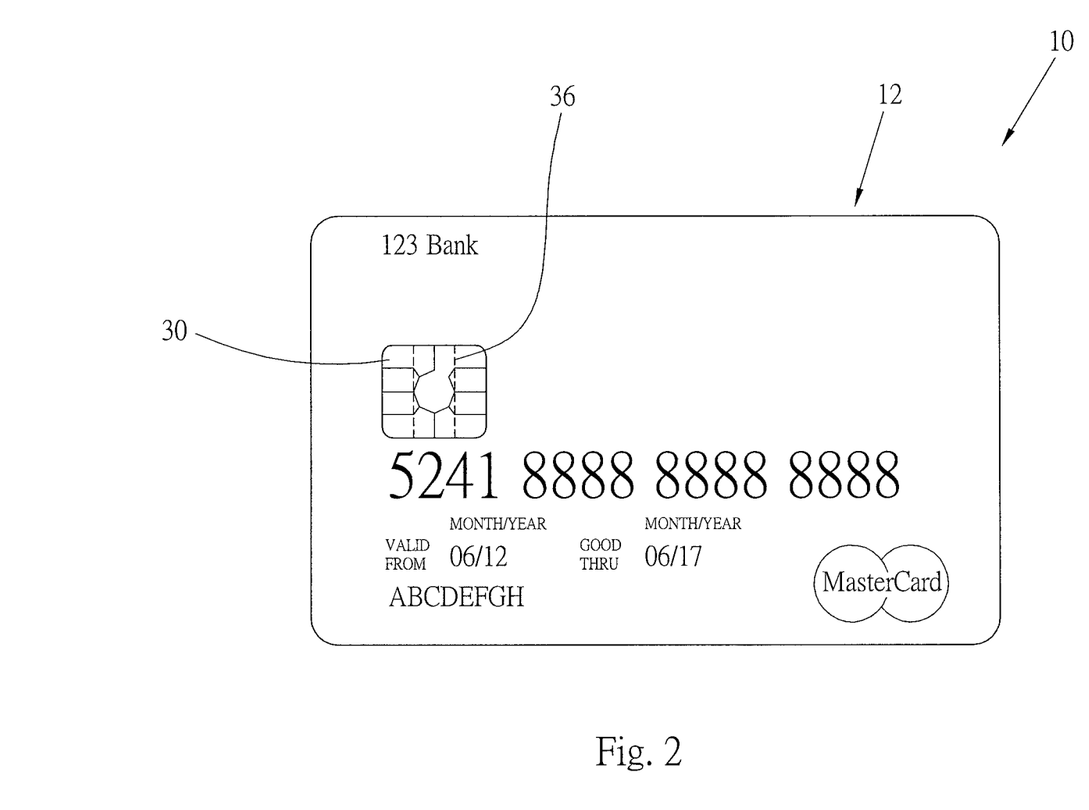
FIG. 2 is a schematic diagram of the appearance of the smart card in FIG. 1.
Figure 4:
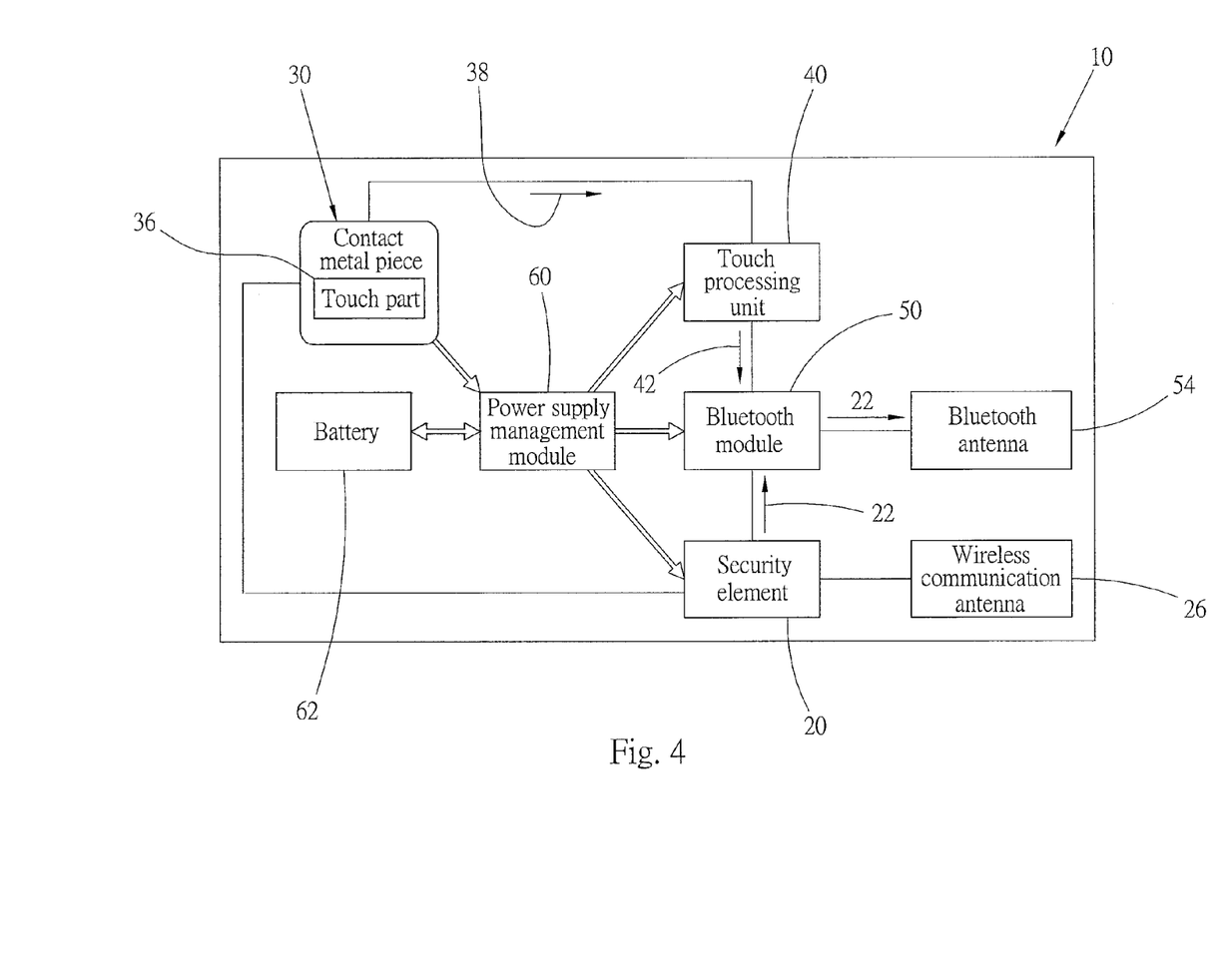
FIG. 4 is an operational diagram of the smart card in FIG. 3.

Referring to FIG. 1, FIG. 2, and FIG. 4, a multifunctional touch smart card 10 according to a first preferred embodiment of the present invention is shown. The multifunctional touch smart card 10 includes a sheet-shaped body 12. A security element 20, a contact metal piece 30, a touch processing unit 40, an operation center, a Bluetooth antenna 54, a power supply management module 60, and a battery 62 are disposed inside the body 12.

The security element 20 is disposed inside the body 12 and stores internal information of the smart card 10. The internal information is, for example, a card number, a validity date, and security information 22 of a credit card. The security information 22 includes a verification information or a security application information, so that the security information 22 can be used to perform security verification such as an online transaction or identity confirmation, and thus the smart card 10 can have a security mechanism for protecting an online transaction or personal information of a user. A wireless communication antenna 26 is electrically connected to the security element 20. The wireless communication antenna 26 is a Near Field Communication (NFC) antenna in the present embodiment. The wireless communication antenna 26 can perform NFC with another apparatus, so that the smart card 10 can have a function of an entrance guard card, a membership card, a contactless credit card or an electronic wallet.

The contact metal piece 30 is disposed on a surface of the body 12 and includes a touch part 36. The touch part 36 can sense a touch of a user by using a sensing technology such as thermal sensing, finger-pressure sensing, resistance or capacitance change sensing, and optical sensing. The touch part 36 can generate a touch record 38. The touch record 38 can record a touch information such as a time length of touching the touch part 36 and/or the number of times of touching the touch part 36. The contact metal piece 30 is electrically connected to the security element 20. The smart card 10 can perform a plug-in contact transaction by using the contact metal piece 30, and can receive external electric power through the contact metal piece 30 to charge the following battery.

The touch processing unit 40 is disposed inside the body 12, has a touch corresponding mechanism, and is electrically connected to the contact metal piece 30. The touch processing unit 40 can receive the touch record 38 generated by the contact metal piece 30, and can send an operation command 42. The operation command 42 may include a different instruction. The operation command 42 having a corresponding instruction is generated according to the touch corresponding mechanism of the touch processing unit 40 and the touch information such as the touch time and/or the number of times of touching recorded by the touch record 38. In this way, when a user touches the touch part 36 of the contact metal piece 30 in a certain touch manner (for example, a certain touch time and/or a certain number of times of touching), the touch processing unit 40 sends an operation command 42 having an instruction corresponding to the touch manner, to control the following Bluetooth module or overall operation of the smart card 10.

The operation center and the Bluetooth antenna 54 are disposed inside the body 12. The operation center is a multifunctional operation core of the smart card 10. In the present embodiment, the operation center is a Bluetooth module 50, and a BLE module is used in the present embodiment. The Bluetooth module 50 is electrically connected to the Bluetooth antenna 54, the touch processing unit 40, and the security element 20. The Bluetooth module 50 performs operation according to the operation command 42 sent by the touch processing unit 40. A different instruction included in the operation command 42 can be used to turn on or turn off the Bluetooth module 50 or pair or connect the Bluetooth module 50 with another apparatus through the Bluetooth antenna 54. The Bluetooth module 50 can receive the security information 22 of the security element 20, and transmit the security information 22 outwards through the Bluetooth antenna 54.

It should be noted that, in a specific application scenario, an additional processing unit may also be disposed in the smart card 10 of the present invention, to assist in the operation of the Bluetooth module 50, so that the smart card of the present invention can be used in more application scenarios.

The power supply management module 60 and the battery 62 are disposed inside the body 12. The battery 62 is a rechargeable lithium battery in the present embodiment. The battery 62 can be charged by obtaining, through the power supply management module 60, electric power received externally by the contact metal piece 30, or supply power to the security element 20, the touch processing unit 40, and the Bluetooth module 50 through the power supply management module 60. The touch part 36 of the contact metal piece 30 obtains required electric power through the touch processing unit 40. The power supply management module 60 is electrically connected to the Bluetooth module 50, and can manage the operation of the battery 62, to prevent the battery 62 from being excessively charged or from excessively supplying power to the security element 20, the touch processing unit 40, and the Bluetooth module 50, thereby ensuring the use safety of the smart card 10.

It should be noted that, when the electric power of the battery 62 is used up, the contact metal piece 30 can also directly supply power to the security element 20, so that the smart card 10 can still perform a conventional plug-in transaction.

A manner of using the smart card 10 of the present invention is described below. A user may insert the smart card 10 of the present invention into a chip card reader, so that the chip card reader reads the contact metal piece 30 of the smart card 10 to perform a conventional contact transaction, and can supply electric power to the contact metal piece 30 of the smart card 10 to charge the battery 60 of the smart card 10. Alternatively, the user places the smart card 10 near a contactless reader, such that the wireless communication antenna 26 performs information transmission with the contactless reader in an NFC manner, so as to complete a contactless transaction.

Figure 3:
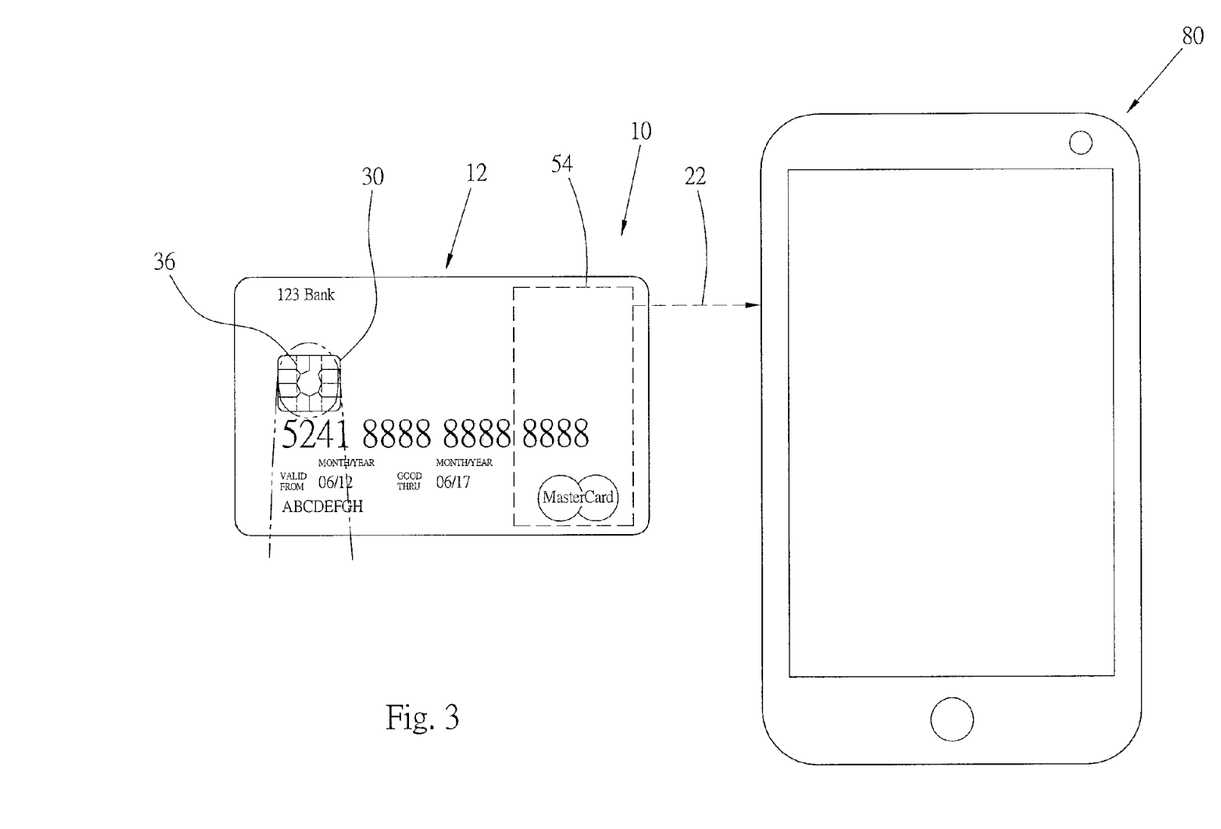
FIG. 3 is a schematic diagram of performing security verification between the smart card in FIG. 1 and FIG. 2 and a terminal.

The smart card 10 of the present invention can also be connected to a terminal through the Bluetooth module 50 to perform a function of security verification. Referring to FIG. 3 and FIG. 4, before the smart card 10 is used to perform security verification, the smart card 10 is first placed near a terminal (in the present embodiment, the terminal is a smart phone 80) and Bluetooth pairing is performed. A user may touch the touch part 36 of the contact metal piece 30 in a preset touch manner (for example, a long press) of the smart card, so that the touch part 36 generates a touch record 38 including a touch information of a long press and sends the touch record 38 to the touch processing unit 40. The touch processing unit 40 then generates, according to the touch corresponding mechanism, an operation command 42 including a pairing instruction and transfers the operation command 42 to the Bluetooth module 50. The Bluetooth module 50 is paired with a Bluetooth element (not shown) of the mobile phone 80 through the Bluetooth antenna 54, and transmits, to the mobile phone 80, the security information 22 received by the security element 22, so that the security information 22 of the smart card 10 is registered in the mobile phone 80, thereby completing the pre-phase work for security verification.

Referring to FIG. 3 and FIG. 4 again, when a user performs online shopping and performs security verification, the user also places the smart card 10 near the mobile phone 80, and touches the touch part 36 of the contact metal piece 30 in a specific touch manner (for example, a light touch). The touch part 36 then sends a touch record 38 including a touch information of a light touch to the touch processing unit 40. The touch processing unit 40 also sends an operation command 42 including a connection instruction to the Bluetooth module 50 according to the touch record 38. The Bluetooth module 50 is connected to the Bluetooth element (not shown) of the mobile phone 80 again through the Bluetooth antenna 54, and transmits the security information 22 to the mobile phone 80. After the mobile phone 80 confirms that the security information 22 transmitted by the smart card 10 is the previously registered security information, the verification of the smart card 10 succeeds, and security verification for a transaction is completed.

It should be noted that, the Bluetooth module 50 of the smart card 10 of the present invention is not limited to only security verification for a transaction. If a contactless reader of a seller supports Bluetooth communication, the Bluetooth module 50 may also be used to directly perform a contactless transaction with the seller.

It should be noted that, because nowadays banks or sellers have many types of security verification, the smart card 10 of the present invention is not limited to the foregoing verification manner. For example, after the Bluetooth module 50 of the smart card 10 is connected to the Bluetooth element of the mobile phone 80, the user needs to touch the touch part 36 of the smart card 10 one more time to confirm that the user permits the transaction.

In addition, the operation command 42 sent by the touch processing unit 40 in the present invention is not limited to control on the Bluetooth module 50, and the operation command 42 may also be used to perform overall operation of the smart card. For example, a user may touch the touch part 36 of the contact metal piece 30 in a preset touch manner of the smart card (for example, double-tap). The touch processing unit 40 then sends an operation command 42 including a sleep instruction to the Bluetooth module 50 according to the touch record 38, so that a Bluetooth function of the Bluetooth module 50 is turned off, and the power supply management module 60 supplies power to only the touch processing unit 40 and the Bluetooth module 50. Therefore, the smart card 10 goes into a sleep state, thereby saving electric power of the smart card 10. When the user wants to wake up the smart card 10, the user then touches the touch part 36 of the contact metal piece 30 in a preset touch manner (for example, another double-tap) of the smart card. The touch processing unit 40 sends an operation command 42 including a wake-up instruction to the Bluetooth module 50 according to the touch record 38. The Bluetooth module 50 then turns on the Bluetooth function of the Bluetooth module 50, and the power supply management module 60 continues to supply power to the security element 20, so as to restore operation of the smart card.

Therefore, the smart card 10 of the present invention can perform operation with a touch button, and the touch button is disposed in a non-functional area of a conventional contact metal piece, so that the button can be integrated with the contact metal piece 30. Therefore, the contact metal piece 30 is not only applicable to a conventional contact transaction, but also can be used to perform touch operation, thereby improving the functionality of the contact metal piece. Next, in the smart card 10 of the present invention, the button is integrated into the contact metal piece 30, so space, originally occupied by the button, inside the body 12 of the smart card 10 can be released. Therefore, the appearance of the smart card becomes simpler and more beautiful. The released space can be further used to perform a circuit layout to improve the flexibility of the circuit layout, add a new element to add a new function to the smart card 10, increase the capacity of a battery to increase endurance, or increase the size of a Bluetooth antenna or/and a wireless communication antenna to enhance the transceiving capability of the antenna, thereby improving the functionality, the practicability, a use time, or the communication intensity of an antenna of the smart card, and effectively using the inner space of the smart card.

Figure 5:
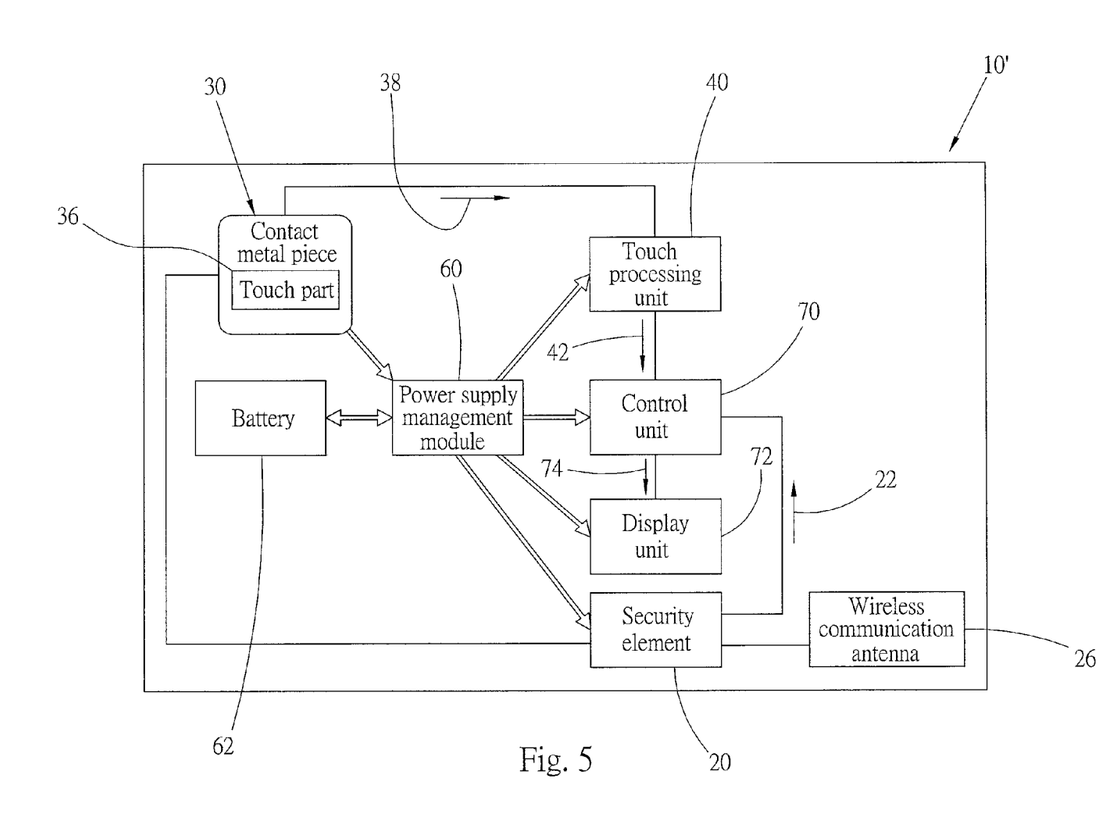
FIG. 5 is an architectural and operational diagram of a smart card according to a second preferred embodiment of the present invention.
Figure 6:
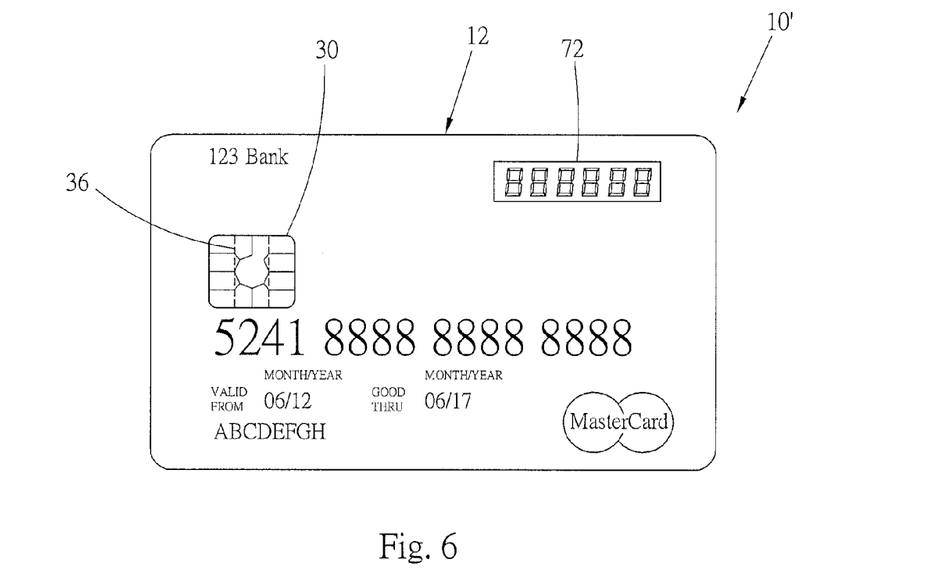
FIG. 6 is a schematic diagram of the appearance of the smart card in FIG. 5.

Referring to FIG. 5 and FIG. 6, a smart card 10' of a second preferred embodiment of the present invention is shown. A body 12 of the smart card 10' similarly includes a security element 20, a wireless communication antenna 26, a contact metal piece 30, a touch processing unit 40, a power supply management module 60, and a battery 62. Differences between the architecture in the present embodiment and that in the first embodiment lie in the following:

The operation center in the present embodiment is a control unit 70. The control unit 70 is also disposed inside the body 12, and is electrically connected to the security element 20, and the touch processing unit 40. The control unit 70 performs operation according to the operation command 42 sent by the touch processing unit 40. A different instruction included in the operation command 42 can be used to cause the control unit 70 to perform operation. The control unit 70 can receive the security information 22 of the security element 20, and convert the security information 22 into a verification message 74. A display unit 72 is an electronic paper (ePaper) in the present embodiment, is disposed on an outer surface of the body 12, and is electrically connected to the control unit 70. The control unit 70 can turn on or turn off the display unit 72 according to the operation command 42, and can cause the display unit 72 to display the verification message 74. The battery 62 can supply power to the control unit 70 and the display unit 72 through the power supply management module 60.

Figure 7:
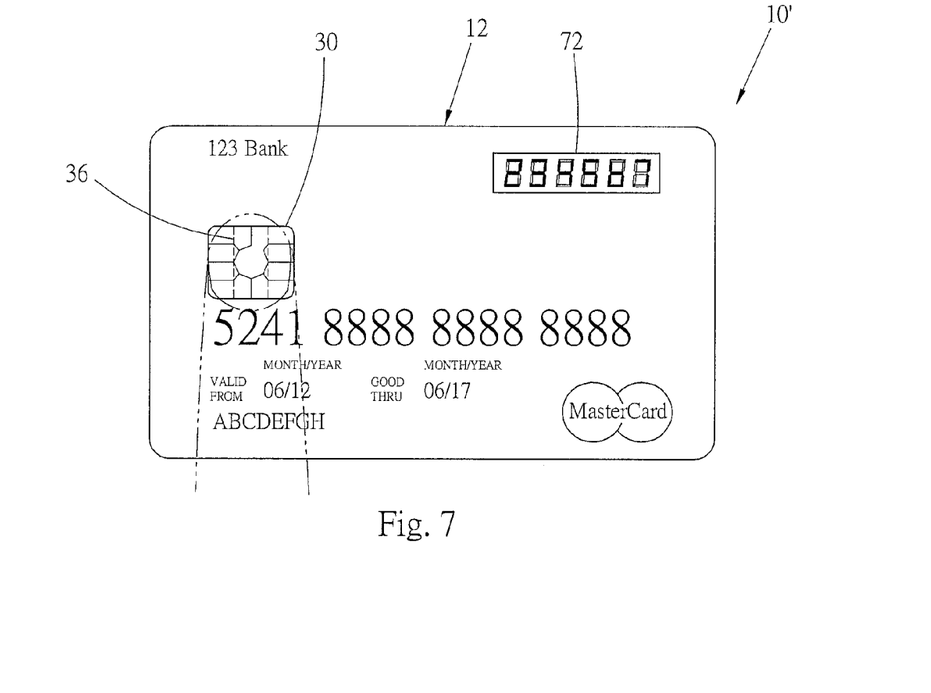
FIG. 7 is a diagram of using the smart card in FIG. 5 and FIG. 6.

A manner of using the smart card 10' in the present embodiment is similar to that in the first preferred embodiment, where a contact transaction or a contactless transaction can be performed. Referring to FIG. 5 and FIG. 7, when a user performs an online transaction, the user touches the touch part 36 of the contact metal piece 30 in a specific manner (for example, a light touch). The touch part 36 generates a touch record 38. The touch processing unit 40 converts the touch record into an operation command 42 including an operation instruction, and transmits the operation command 42 to the control unit 70.

After receiving the operation command 42, the control unit 70 receives the security information 22 from the security element 20, performs an operation on the security information 22 to convert the security information 22 into the verification message 74, and turns on the display unit 72 so that the display unit 72 displays the verification message 74 (in the present embodiment, the verification message 74 is a one-time password, for example, 238567 shown in FIG. 7). The user then enters the verification message 74 onto a verification page of a bank, so that the user can pass the verification of the bank, to complete the online transaction.

After the transaction is completed, the user can further touch the touch part 36 of the contact metal piece 30 in a specific manner (for example, another light touch), so that the touch processing unit 40 transmits an operation command 42 including a turn-off instruction to the control unit 70, and the control unit 70 turns off the display unit 72.

It should be noted that, the content displayed by the display unit 72 in the present embodiment is not limited to the verification message 74. If the smart card 10' is combined with a function of an electronic wallet (for example, EasyCard or iPASS), after the user touches the touch part 36 in a specific manner, the display unit 72 can display information such as the balance in the electronic wallet.

Figure 8:
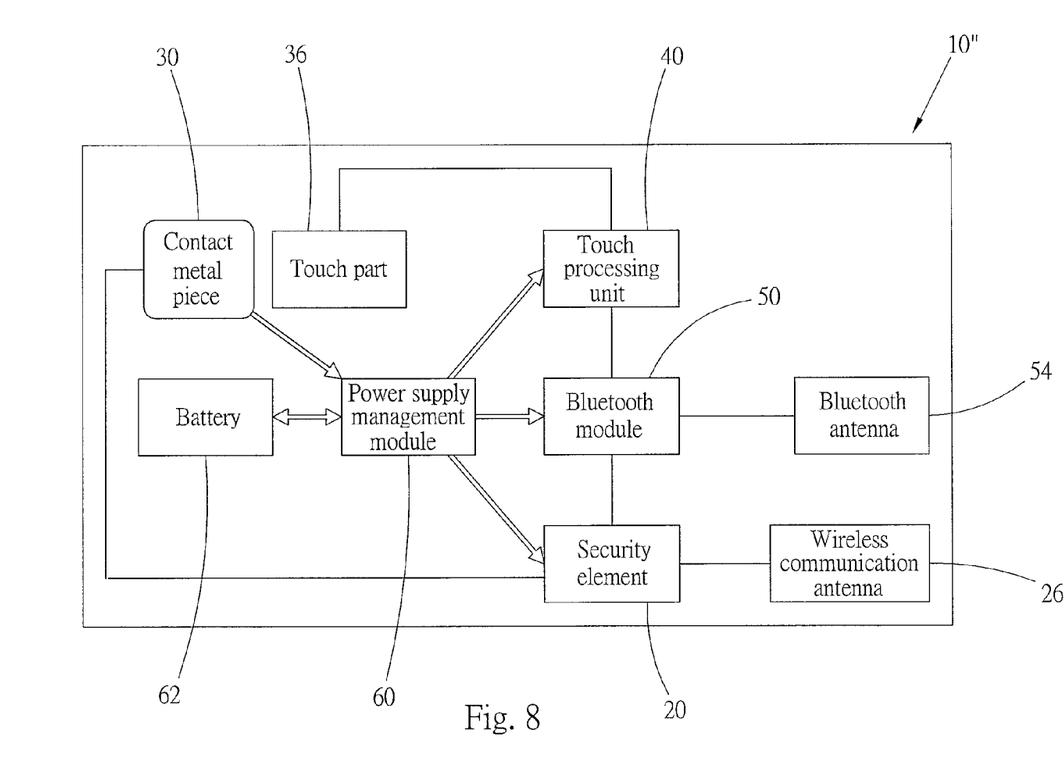
FIG. 8 is an architectural diagram of a smart card according to a third preferred embodiment of the present invention.
Figure 9:
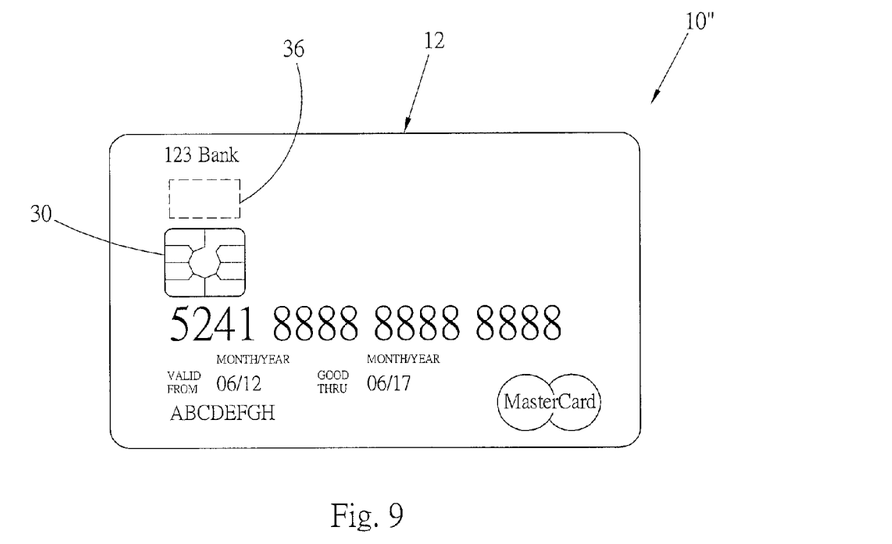
FIG. 9 is a schematic diagram of the appearance of the smart card in FIG. 8.

Referring to FIG. 8 and FIG. 9, a smart card 10" of a third preferred embodiment of the present invention is shown. The structure and usage manner of the smart card 10" are approximately the same as those of the smart card in the first preferred embodiment. A security element 20, a wireless communication antenna 26, a contact metal piece 30, a touch processing unit 40, a Bluetooth module 50, a Bluetooth antenna 54, a power supply management module 60, and a battery 62 are also disposed inside a body 12 of the smart card 10". A user also uses the touch part 36 to control the Bluetooth module 50 and overall operation of the smart card 10". Differences between the present embodiment and the first preferred embodiment lie in the following:

The touch part 36 and the contact metal piece 30 are separately disposed. The touch part 36 is a metal piece in the present embodiment, and can sense a touch by using a sensing technology such as thermal sensing, finger-pressure sensing, resistance or capacitance change sensing, and optical sensing. The touch part 36 is disposed at any position of the body 12 of the smart card 10", and is located inside the body 12.

Figure 10:
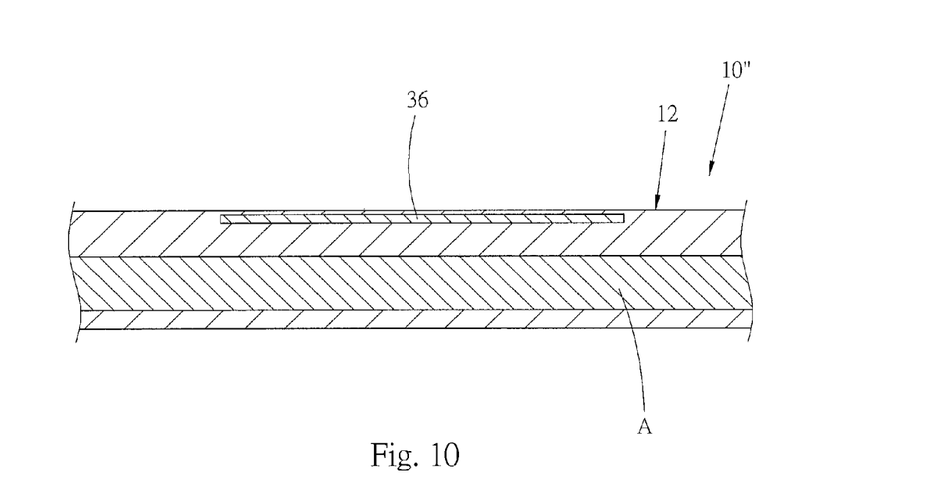
FIG. 10 is a schematic sectional view of a touch position of the smart card in FIG. 9.

In the present embodiment, the touch part 36 is located over the contact metal piece 30. Referring to FIG. 10, the touch part 36 of the present invention is a touch button, and the touch button has a small volume and a small thickness and can be disposed overlapping another element or circuit. For example, FIG. 10 shows that a circuit A can be disposed under the touch part 36. Therefore, it may be seen that, unlike a conventional mechanical button, the touch part 36 of the present invention needs to occupy no separate space, and can be disposed at a position (for example, over a circuit or element) at which the mechanical button cannot be disposed. Therefore, because the touch part 36 of the present invention can be disposed at any position of the body 12 of the smart card, the appearance of the smart card may be easier to design and more beautiful, the structure of the smart card can be further simplified, and the inner space, occupied by the conventional mechanical button, of the body 12 is released. Therefore, a new element can be added to the smart card 10' to add a function to the smart card 10', or the capacity of the battery 62 is increased, or the area of the Bluetooth antenna 54 and/or the wireless communication antenna 26 is increased, so that the smart card 10" has greater electrical endurance or communication intensity.

It should be noted that, the touch part 36 in the present embodiment may also be not disposed in the smart card 10" overlapping another element or circuit. An area occupied by a touch button in the body 12 of the smart card 10' is smaller than an area occupied by the conventional mechanical button. Therefore, even if the touch part 36 in the present embodiment is independently disposed inside the smart card 10", a part of the inner space of the body 12 of the smart card 10" can still be saved.

Figure 11:
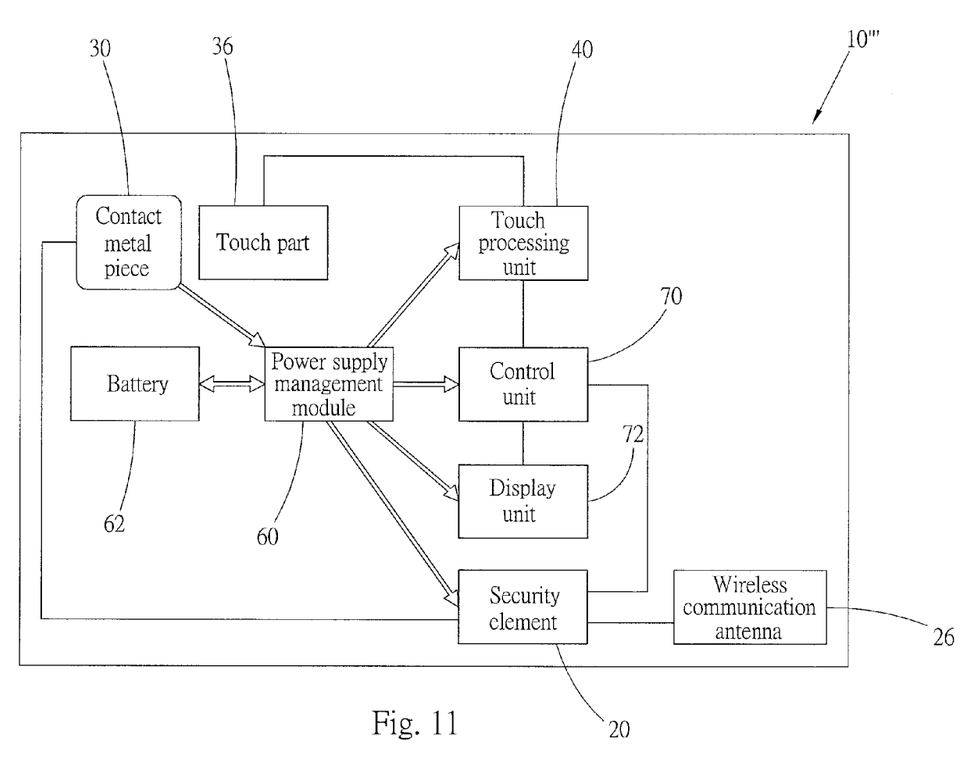
FIG. 11 is an architectural diagram of a smart card according to a fourth preferred embodiment of the present invention.
Figure 12:
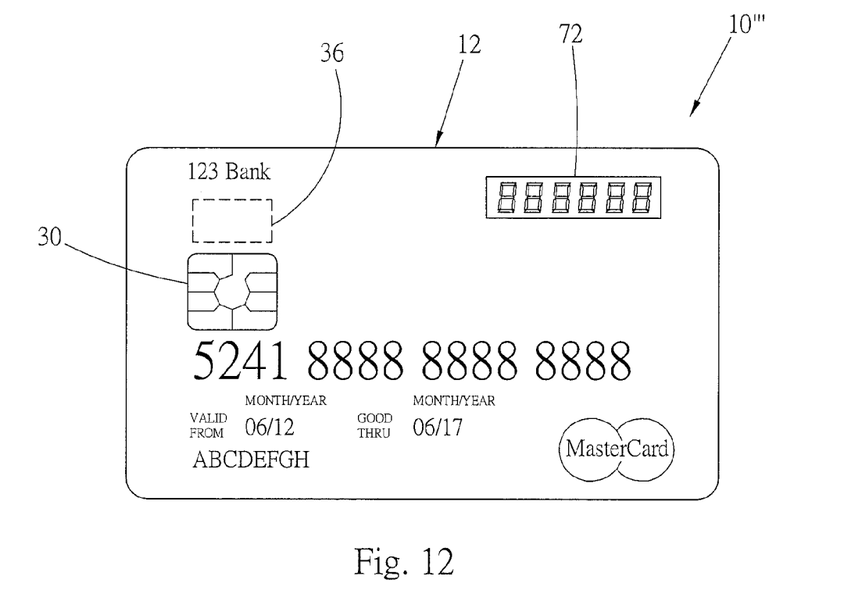
FIG. 12 is a schematic diagram of the appearance of the smart card in FIG. 11.

Referring to FIG. 11 and FIG. 12, a smart card 10''' of a fourth preferred embodiment of the present invent ion is shown. The structure and usage manner of the smart card 10''' are approximately the same as those of the smart card in the second preferred embodiment. A security element 20, a wireless communication antenna 26, a contact metal piece 30, a touch processing unit 40, a power supply management module 60, a battery 62, a control unit 70, and a display unit 72 are similarly included inside a body 12 of the smart card 10'''. A user also uses the touch part 36 to control the control unit 70 and overall operation of the smart card 10'''. Differences between the present embodiment and the second embodiment lie in the following:

The touch part 36 and the contact metal piece 30 are separately disposed. The touch part 36 in the present embodiment is also a metal piece, is disposed at any position of the body 12 of the smart card 10''', is placed inside the body 12, and is located over the contact metal piece 30.

In this way, the touch part 36 in the present embodiment may also be disposed at any position of the body 12 of the smart card 10'''. An element or circuit may also be disposed under the touch part 36, so that the touch part 36 does not independently occupy the inner space of the body 12 of the smart card 10''', the internal structure of the smart card is simplified, and the inner space of the body 12 of the smart card 10''' can be effectively used, to add a new function or improve the functionality of the smart card 10'''.

In the smart card of the present invention, a touch button is used to replace a conventional mechanical button, so that the button of the present invention can prevent a situation in which the conventional mechanical button becomes less sensitive or even cannot be used because a mechanical structure is aged or worn, thereby ensuring the usability of the button. Next, because the touch button has a small volume and a small thickness, the touch button can be disposed overlapping another element or circuit, so that the touch button can be disposed at any position of the body of the smart card. Therefore, the appearance of the smart card is easier to design and more beautiful, inner space originally occupied by a button in the body can be further released, and the structure of the smart card is simplified. The released space can be used to perform a circuit layout to improve the flexibility of the circuit layout, dispose a new element to add a function to the smart card to improve the functionality of the smart card, increase the capacity of a battery to increase a use time of the battery, or increase the volume of a Bluetooth antenna or/and a wireless communication antenna to improve a transceiving capability of the Bluetooth antenna or/and the wireless communication antenna. Moreover, in the present invention, the touch button is also integrated into a contact metal piece, and the button is disposed in an unused area of a conventional contact metal piece, so that the contact metal piece can not only be used to perform a conventional plug-in contact transaction, but also can be operated in a touch manner to perform various functions of turning on the smart card, turning off the smart card, making the smart card sleep, performing pairing or establishing a connection, thereby improving the functionality of the contact metal piece.

The embodiments disclosed above are only intended to describe the present invention rather than to limit the present invention. For example, the foregoing touch manner of a touch part is provided only as an example rather than an only touch manner that the touch part can use to cause the smart card to perform the foregoing operation. The multifunctional touch smart card provided in the present invention is an innovative technique in the present technical field and have an inventive step.

What is claimed is:

1. A multifunctional touch smart card, comprising:
    an operation center being an operation core of the smart card;
    a touch part for controlling operation of the operation center;
    a security element for performing operation under the control of the operation center;
    a battery for supplying power to the operation center, the security element, and the touch part;
    a power supply management module for manipulating operation of the battery under the control of the touch part, and the battery also supplies power to the power supply management module; and
    a touch processing unit, wherein the touch processing unit has a touch corresponding mechanism and is capable of sending an operation command, the operation command being capable of comprising a different instruction, the touch part is capable of generating a touch record, the touch record being capable of comprising a different touch information, the touch processing unit generates, according to the different touch information of the touch record by using the touch corresponding mechanism, the operation command comprising a corresponding instruction, the touch part controls the operation center and the power supply management module by using the operation command of the touch processing unit, and the battery supplies power to the touch processing unit.

2. The smart card according to claim 1, further comprising: a contact metal piece, wherein the touch part is located at the contact metal piece.

3. The smart card according to claim 2, further comprising: a Bluetooth antenna, wherein the operation center is a Bluetooth module, the Bluetooth module is controlled by the touch part, the security element is further capable of sending security information, and the Bluetooth module is capable of receiving the security information of the security element and transmitting the security information outwards through the Bluetooth antenna.

4. The smart card according to claim 2, further comprising: a display unit, wherein the operation center is a control unit, the control unit is controlled by the touch part, the security element is further capable of sending security information, the control unit is capable of receiving the security information of the security element and converting the security information into a verification message, the display unit is capable of displaying the verification message sent by the control unit, and the battery also supplies power to the display unit.

5. The smart card according to claim 2, further comprising: a wireless communication antenna for performing information transmission with the security element.

6. The smart card according to claim 2, wherein the touch record of the touch part is capable of recording a touch information such as a time length of touching the touch part and/or the number of times of touching the touch part, and the touch processing unit generates, according to a different touch information comprised in the touch record by using the touch corresponding mechanism, an operation command comprising a corresponding instruction.

7. The smart card according to claim 1, wherein the touch part is a metal piece, disposed inside the smart card.

8. The smart card according to claim 7, further comprising: a Bluetooth antenna, wherein the operation center is a Bluetooth module, the Bluetooth module is controlled by the touch part, the security element is capable of sending security information, and the Bluetooth module is capable of receiving the security information of the security element and transmitting the security information outwards through the Bluetooth antenna.

9. The smart card according to claim 7, further comprising: a display unit, wherein the operation center is a control unit, the control unit is controlled by the touch part, the security element is further capable of sending security information, the control unit is capable of receiving the security information of the security element and converting the security information into a verification message, the display unit is capable of displaying the verification message sent by the control unit, and the battery also supplies power to the display unit.

10. The smart card according to claim 7, further comprising: a wireless communication antenna for performing information transmission with the security element.

11. The smart card according to claim 1, further comprising: a Bluetooth antenna, wherein the operation center is a Bluetooth module, the Bluetooth module is controlled by the touch part, the security element is further capable of sending security information, and the Bluetooth module is capable of receiving the security information of the security element and transmitting the security information outwards through the Bluetooth antenna.

12. The smart card according to claim 11, wherein the Bluetooth module is a Bluetooth low energy (BLE) module.

13. The smart card according to claim 1, further comprising: a display unit, wherein the operation center is a control unit, the control unit is controlled by the touch part, the security element is further capable of sending security information, the control unit is capable of receiving the security information of the security element and converting the security information into a verification message, the display unit is capable of displaying the verification message sent by the control unit, and the battery also supplies power to the display unit.

14. The smart card according to claim 1, further comprising: a wireless communication antenna for performing information transmission with the security element.

15. The smart card according to claim 14, wherein the wireless communication antenna transmits information outwards in a Near Field Communication (NFC) manner.

16. The smart card according to claim 1, wherein the touch record of the touch part is capable of recording a touch information such as a time length of touching the touch part and/or the number of times of touching the touch part, and the touch processing unit generates, according to a different touch information comprised in the touch record by using the touch corresponding mechanism, an operation command comprising a corresponding instruction.

* * * * *

UNITED STATES PATENT AND TRADEMARK OFFICE
CERTIFICATE OF CORRECTION

PATENT NO. : 9,916,529 B1
APPLICATION NO. : 15/462223
DATED : March 13, 2018
INVENTOR(S) : Lee et al.

It is certified that error appears in the above-identified patent and that said Letters Patent is hereby corrected as shown below:

On the Title Page

Item (72) Inventor is corrected to read:
-- Darren Tien-Chi Lee, Taichung, (TW);
Jeng Lung Li, Taichung, (TW);
Kiyohiro Nakayama, San Marino, CA (US) --.

Signed and Sealed this
Seventeenth Day of July, 2018

Andrei Iancu
*Director of the United States Patent and Trademark Office*